United States Patent

[11] 3,625,201

| [72] | Inventor | William P. Murphy, Jr<br>Miami, Fla. |
|---|---|---|
| [21] | Appl. No. | 880,801 |
| [22] | Filed | Nov. 28, 1969 |
| [45] | Patented | Dec. 7, 1971 |
| [73] | Assignee | Cordis Corporation<br>Miami, Fla. |

[54] TESTER FOR STANDBY CARDIAC PACING
6 Claims, 3 Drawing Figs.

[52] U.S. Cl. ............................................. 128/2.06 R,
128/419 P
[51] Int. Cl. ....................................................... A61b 5/04
[50] Field of Search ........................................... 128/2.06 R,
419 P; 333/81 R; 307/236

[56] References Cited
UNITED STATES PATENTS

| 3,478,746 | 11/1969 | Greatbatch .................. | 128/419 P |
| 3,508,538 | 4/1970 | Keller, Jr. ..................... | 128/419 P |
| 3,517,663 | 6/1970 | Bowers et al. ................ | 128/419 P |

*Primary Examiner*—William E. Kamm
*Attorney*—Kenway, Jenney & Hildreth

ABSTRACT: The tester disclosed herein facilitates the proper placement of the electrode of a standby cardiac pacer by attenuating both the stimulating pulses generated by the pacer and the spontaneous cardiac signals which either inhibit or trigger the operation of the pacer during standby operation. A nonlinear network is employed for providing different attenuating factors.

PATENTED DEC 7 1971 3,625,201

INVENTOR
WILLIAM P. MURPHY JR.
BY
Kenway, Jenney & Hildreth
ATTORNEYS

TESTER FOR STANDBY CARDIAC PACING

BACKGROUND OF THE INVENTION

This invention relates to cardiac pacing and more particularly to a tester which facilitates the proper placement of the electrode of a standby cardiac pacer or other pacer which generates cardiac stimulating pulses under the control of spontaneous cardiac signals.

In standby cardiac pacing, e.g. employing a cardiac pacer such as those illustrated in U.S. Pat. No. 3,431,912 issued Mar. 11, 1969 to J. W. Keller, Jr., cardiac stimulating pulses are applied only when the patient's heart fails to beat normally, such normal beating being sensed by means of a spontaneous cardiac signal. Preferably, both stimulation and sensing are accomplished through a single electrode, interaction between the input and output being controlled by the pacer circuitry itself.

Recently, there has been an increasing use of a so-called pervenous lead arrangement for cardiac pacing. This arrangement has the advantage that no major surgery is required since the electrode is introduced into the endocardium through the venous system. On the other hand, proper placement of the electrode is difficult due to the lack of direct visualization of the position of the electrode in relation to the heart itself.

It has previously been proposed that proper positioning of a stimulating electrode be determined by providing attenuated stimulating pulses during empirical placement of the electrode. In this way, assurance is obtained that the full-strength stimulating pulses will provide adequate stimulation even though there is a postoperative increase in the threshold of response of the ventricles.

In the case of standby pacing, however, proper operation of the pacer requires not only that the stimulation pulses be effectively coupled to the heart but also that spontaneous signals generated by the heart during normal beating be reliably sensed by the pacer.

Among the several objects of the present invention may be noted the provision of a tester for determining proper placement of an electrode which is to be used for standby pacing; the provision of such a tester which tests both sensing and stimulation thresholds; and the provision of such a tester which is easy to use and which is relatively simple and inexpensive.

Other objects and features will be in part apparent and in part pointed out hereinafter.

SUMMARY OF THE INVENTION

Briefly, a threshold tester according to the present invention is adapted for use between a cardiac lead and a standby cardiac pacer of the type which has a combined input-output terminal and which generates cardiac stimulating pulses at the terminal under the control of spontaneous cardiac signals received at the terminal. The tester employs both a first resistive attenuator for reducing the amplitude of spontaneous cardiac signals picked up by the lead and a second resistive attenuator for reducing the amplitude of stimulating pulses provided at the terminal. The attenuators are connected in a nonlinear network so that the stimulating pulses and the spontaneous cardiac signals are differently attenuated.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
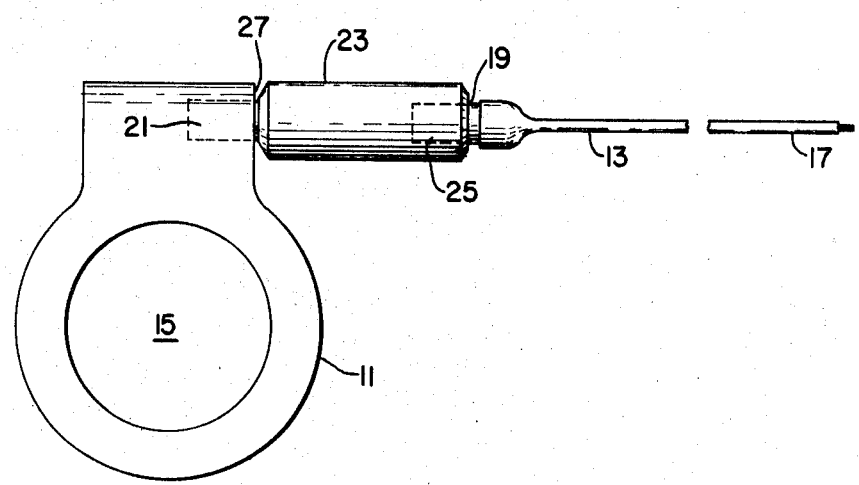
FIG. 1 is a plan view of a tester according to this invention, shown in operative relationship between a cardiac pacer and a cardiac lead.

Referring now to FIG. 1, there is indicated at 11 an implantable standby cardiac pacer of essentially conventional construction. As noted previously, preferred forms of the standby pacer employ a single pervenous lead, as indicated at 13, for both sensing spontaneous cardiac signals and for applying stimulating pulses. With such a single lead system, a common or return path is conveniently provided by means of a conductive ground plate 15 forming a major portion of the case of pacer 11. However, the tester may also be used with bipolar lead arrangements in which no ground plate is used.

One end of lead 13 terminates in an electrode 17 which is of conventional construction and is adapted to provide electrical coupling to polarizable tissue in a patient's heart when the lead 13 is introduced into the pericardium through the venous system as mentioned previously. The other end of lead 13 terminates in a plug 19. Plug 19 is adapted to be received in a mating socket 21 in the pacer 11 for connection to the pacer's circuitry in conventional manner. In FIG. 1, however, there is interposed between the lead 13 and the pacer 11 a tester 23 in accordance with the present invention. Tester 23 includes at one end a socket 25 which is essentially identical to the socket 21 in the tester and, at the other end, a plug 27 which is essentially identical to the plug 19 on the lead 13. Thus, the tester 23 may be readily interposed between the pacer 11 and its lead 13.

In standby pacing, normal beating of the patient's heart is sensed by means of the QRS complex in the vicinity of the ventricle. Stimulation is provided by means of a pulse, e.g. negative-going, which is applied from the pacer to the heart when the heart fails to beat normally.

As is understood by those skilled in the art, the sensed QRS signal is of relative small amplitude, e.g. a few millivolts. The stimulation signal, however, is typically provided by means of a current source having an available driving potential of several volts.

Figure 2:
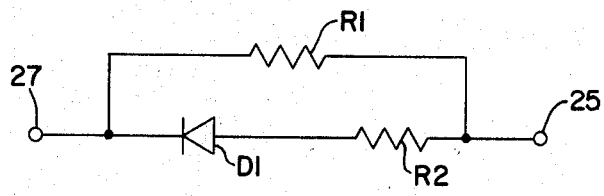
FIG. 2 is a schematic circuit diagram of one embodiment of attenuating circuitry useful in the tester.

The present invention employs this difference in amplitude to differently attenuate the sensed spontaneous cardiac signals and the stimulating pulses applied to the heart. Fig. 2 represents an electrical circuit suitable for use in the tester 23 between the socket terminal 25 and the plug terminal 27 to provide such differential attenuation. The circuit employs a first resistor R1 which is connected directly between the terminals 25 and 27 and a second resistor R2 which is connected between these same terminals through a silicon diode D1. These components can conveniently be molded in a plastic matrix between the two terminals, the plastic forming the body of the tester.

Diode D1 causes the attenuating network to function in a nonlinear manner. As is understood, the diode D1 has a nonlinear and unsymmetrical conduction characteristic and is essentially nonconducting until a forward-biasing potential above a predetermined level is applied. In the case of a silicon diode, significant conduction begins to occur only when the forward bias reaches a level of about 0.5 volts. Accordingly, low-level signals, such as the spontaneous cardiac signal, are not conducted through the diode in either direction. It will be seen that spontaneous cardiac signals applied through lead 13 to terminal 25 will be attenuated by the resistor R1 alone before being applied to the pacer. On the other hand, negative-going stimulation pulses generated in the pacer will forward bias the diode D1 and will thus be effectively attenuated by a resistance approximately equal to the parallel combination of resistors R1 and R2, this being a lower value of resistance than either of the resistors alone as is understood by those skilled in the art.

In practice, the resistance of resistor R1 will typically be relatively high, e.g. 50,000 ohms, depending on the attenuation required and the input impedance of the sensing circuit in the pacer. As noted, this resistor alone attenuates the spontaneous cardiac signals. The resistance of resistor R2 will typically be relatively low, e.g. 10,000 ohms and thus, in the parallel combination of resistors, will essentially predominate and determine the attenuation factor. As will also be understood, various other polarity-sensitive or nonlinear networks can be arranged so as to present different impedances which depend upon the polarity of the one terminal with respect to the other.

In view of the above, it can be seen that respective values of attenuation can be applied for testing the stimulation and sensing thresholds. Thus, the electrode 17 can be positioned empirically with the tester in place and a reasonable assurance will be provided that reliable operation will be obtained when the pacer is later implanted without the tester, the level of attenuation in each case being chosen to allow for a postoperative decrease in the effectiveness of the electrical coupling between the electrode 17 and the patient's heart. During testing or empirical positioning of the electrode, a common ground may be established between the ground plate 15 and the patient's body in any convenient manner.

Figure 3:
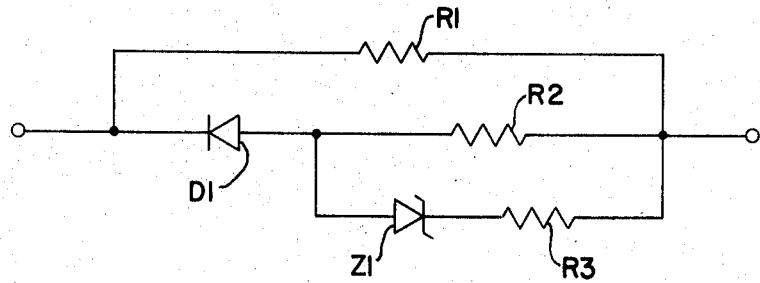
FIG. 3 is a schematic circuit diagram of another embodiment of such circuitry.

As a stimulation threshold which is initially relatively high, e.g. due to poor electrode placement, will typically increase less after initial installation than a threshold which is initially quite low, it has been found desirable to provide less attenuation of higher level stimulation pulses than lower level pulses when testing with a pacer having an adjustable output level, e.g. a pacer of the type typically used for temporary external pacing. The circuit of FIG. 3 provides such a difference in attenuation as a function of amplitude. As in the circuit of FIG. 2, the resistor R1 alone attenuates sensed signals flowing from the heart to the pacer. Similarly, relatively low-level output pulses are attenuated mainly by the resistor R2 operating through the diode D1. However, when the pacer provides relatively high-level output pulses, a Zener diode Z1 conducts and allows current to flow additionally through a resistor R3 which is then effectively in parallel with resistor R2. As will be understood by those skilled in the electrical arts, this parallel connection of resistor R3 with resistor R2 provides a lower resistance and thus lower attenuation for higher level output pulses.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A threshold tester for use between a cardiac lead and a cardiac pacer of the type which has a combined input-output terminal and which generates cardiac stimulating pulses at said terminal under the control of spontaneous cardiac signals received at said terminal, said tester comprising:
   first and second terminal means; and
   a nonlinear network connected between said first and second terminal means for differently attenuating said stimulating pulses and said spontaneous cardiac signals.

2. A threshold tester for use between a cardiac lead and a cardiac pacer of the type which has a combined input-output terminal and which generates cardiac stimulating pulses at said terminal under the control of spontaneous cardiac signals received at said terminal, said tester comprising:
   first and second terminal means; and
   a nonlinear network connected between said first and second terminal means, said network including at least two resistors and circuit means including at least one diode for nonlinearly connecting said resistors between said first and second terminal means as a function of the potential between said input-output terminal and said lead thereby to differently attenuate said stimulating pulses and said spontaneous cardiac signals.

3. A tester as set forth in claim 2 wherein one of said resistors is connected directly between said first and second terminal means and the other of said resistors is connected between said first and second terminal means through said diode.

4. A tester as set forth in claim 3 including a zener diode and a third resistor connected in series across said other resistor thereby to reduce the attenuation applied to stimulating pulses which exceed a predetermined level.

5. A tester as set forth in claim 2 wherein said network further comprises a zener diode interconnected with said resistors, for reducing the attenuation of stimulating pulses which exceed a predetermined level.

6. A threshold tester for use between a cardiac lead and a cardiac pacer of the type which has a combined input-output terminal and which generates cardiac stimulating pulses at said terminal under the control of spontaneous cardiac signals received at said terminal, said tester comprising:
   a first resistive attenuator for reducing the amplitude of spontaneous cardiac signals picked up by said lead prior to application to said terminal;
   a second resistive attenuator for reducing the amplitude of said stimulating pulses provided at said terminal prior to application to said lead; and
   circuit means including amplitude-responsive means interconnected with said resistors for nonlinearly connecting said attenuating means between said pacer and said lead as a function of the amplitude of the potential between said input-output terminal and said lead thereby to differently attenuate said stimulating pulses and said spontaneous cardiac signals.

* * * * *